March 1, 1960 A. W. GAUBATZ 2,926,900
SPEED SWITCH LUBRICATING SYSTEM
Filed Oct. 23, 1958
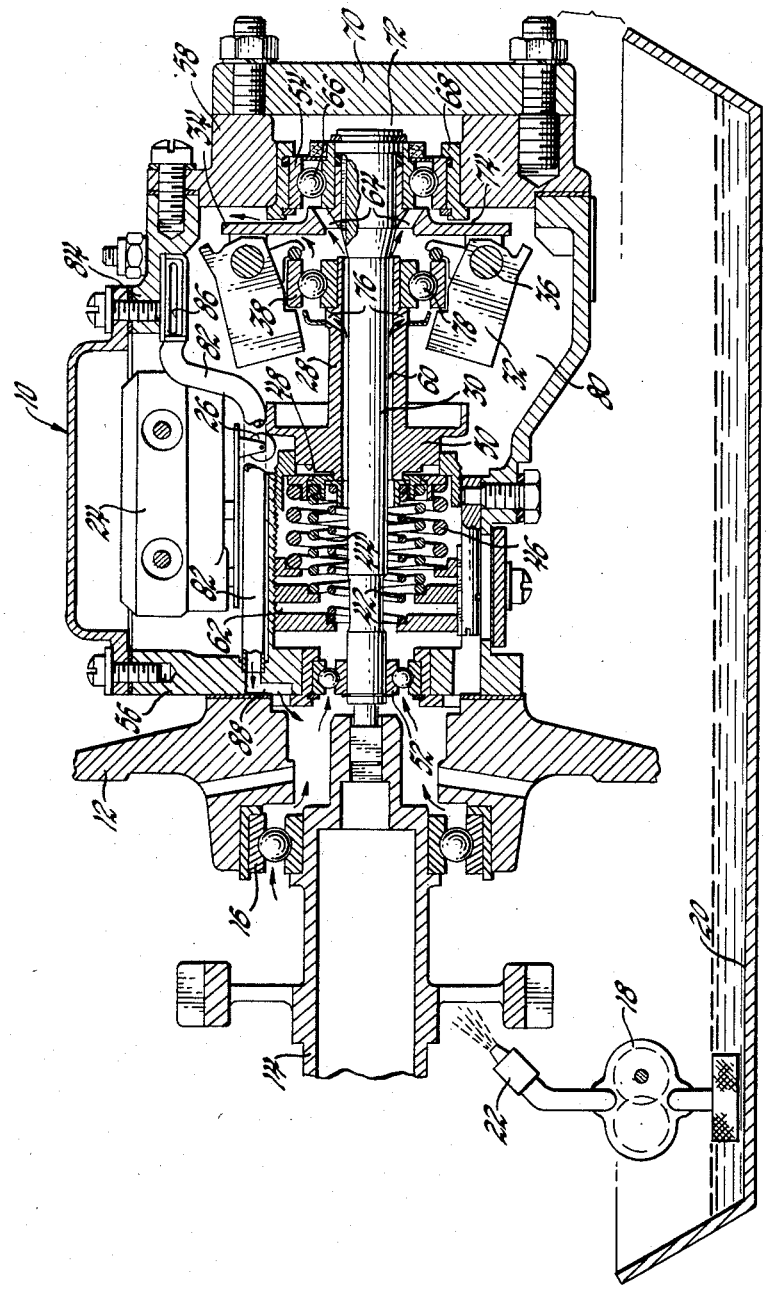
INVENTOR.
Arthur W. Gaubatz
BY
R. F. Barnard
ATTORNEY ns patent office 2,926,900
Patented Mar. 1, 1960

2,926,900

SPEED SWITCH LUBRICATING SYSTEM

Arthur W. Gaubatz, Indianapolis, Ind., assignor to General Motors Corporation, Detroit, Mich., a corporation of Delaware Application October 23, 1958, Serial No. 769,133

5 Claims. (Cl. 264—15)

The present invention relates to a lubricating mechanism for a speed controlled apparatus and more specifically one in which the speed responsive portion of the apparatus is utilized to provide the motivating force for moving lubricant therethrough.

In control apparatus of the type shown in Patent 2,786,667 Gaubatz, a speed responsive shaft is suitably mounted on a plurality of bearing members and which shaft is in turn adapted to drive governor or flyweights in such a manner as to control a plurality of switching devices. In the past, the ball bearings have been sealed and grease packed with a limited supply of lubricant. Bearing failures resulted due to evaporation and oxidation of the lubricant in the grease. The dry bearings would then rapidly heat and fail.

In the present invention a unique lubricating mechanism is provided whereby the centrifugal action of the flyweights is utilized with other structure to draw an oil mist through the bearings to provide the requisite lubrication therefor. The oil mist utilized for lubrication purposes is already in the control apparatus environment since it is used for lubricating other portions of the accessory drive mechanism with which the apparatus is associated. By virtue of the subject unique design and utilization of components already in existence in the apparatus, a relatively simple and inexpensive lubricating system is provided which substantially eliminates failures due to burned out bearings as experienced in the past.

The details as well as other objects and advantages of the subject device will be apparent from a perusal of the detailed description which follows.

The drawing shows a speed control apparatus embodying the subject lubricating system.

The control apparatus, per se, is the same as that shown in the aforenoted Gaubatz patent and the present invention relates to the manner in which the apparatus has been modified to provide the subject lubricating system.

While of general applicability, the present invention has been illustrated in a part of the environment of a turbine engine control system. A control apparatus is shown generally at 10 and is adapted to be suitably mounted on a supporting bracket 12 which also provides support for one end of an auxiliary drive shaft 14. One end of auxiliary drive shaft 14 is supported within a bearing member 16 suitably housed within the supporting bracket. The auxiliary drive shaft mechanism including bearing 16 is lubricated with an oil mist. To a certain extent an oil mist will inevitably exist wherever oil is delivered to rapidly rotating parts in the presence of air. However, if it is desired to insure a regulated quantity of oil mist, means such as a pump 18 may draw lubricant from a casing sump 20 and discharge the same through a nozzle 22 which will mix the oil with air to fill the casing with such mist.

Briefly, control apparatus 10 includes a plurality of peripherally disposed microswitch devices 24 having switch actuating members 26 adapted to be sequentially engaged by a sleeve member 28 slidably disposed on a governor shaft 30. A plurality of centrifugally operating flyweights 32 are pivotally mounted through suitable brackets on a flange member 34 secured for rotation with one end of shaft 30. The other end of governor shaft 30 is fixed to the auxiliary drive shaft 14 to be driven thereby.

As the governor shaft is rotated with progressively increasing speeds flyweights 32 move radially outwardly causing a pivoting movement about their pivot points 36. Weights 32 engage a thrust bearing member 38, the inner race of which is fixed to sleeve 28 to urge the latter in a leftwardly direction as viewed in the drawings. The leftward or switch actuating movement of sleeve 28 is progressively resisted by a plurality of springs 42, 44 and 46 which are sequentially engaged by a stepped face 48 formed at the enlarged end 50 of sleeve 28. Thus when the governor shaft speed reaches a predetermined value, spring 42 is overcome permitting sleeve end 50 to actuate the first member thereby actuating the low speed switch. Thereafter, as the intermediate and high speed springs 44 and 46 are overcome the corresponding switches will be energized. It is apparent that the switches 24 may be utilized in any manner to control the operation of the power plant with which the control apparatus is associated.

In addition to thrust bearing 38, control apparatus 10 includes a pair of end bearings 52 and 54 which support the governor shaft 30 within the control apparatus casing sections 56 and 58. As already noted, in the past, the bearings within the control apparatus have failed due to evaporation and oxidation of the sealed lubricant. Further, notwithstanding the proximity of the oil mist to the control apparatus, such mist could not lubricate the bearings due to the sealed condition of the latter. In the present invention, control apparatus 10 has been suitably modified so that the oil mist theresurrounding is adapted to be circulated through the apparatus in a way to insure proper lubrication of the bearings disposed therewithin.

As already noted, sleeve 28 is coaxially mounted upon the governor shaft 30 for sliding movement relative thereto. In addition, sleeve 28 is radially spaced from shaft 30 to form an annular space or passage 60 therebetween. The left end of space 60 is in open communication with spring chamber 62 which in turn openly communicates through unsealed bearing 52 with the exterior of the control apparatus proximate the auxiliary shaft 14.

Flyweight supporting flange 34 is provided with a plurality of inclined ports 64 generally aligned with, although axially spaced from, the outer or right end of annular space 60. Flange ports 64 extend in the direction of the ball members 66 of bearing 54. Bearing 54 is mounted in a thrust member 68 suitably mounted within end casing 58. Casing 58 is enclosed by a cover 70 and defines therewith a bearing chamber 72. Flange 34 and thrust member 68 are axially spaced so as to provide a radially extending annular passage 74 therebetween the purpose of which will subsequently be made clear.

A plurality of inclined passages 76 are formed within sleeve 28 intermediate the ends thereof and communicate at one end with annular space 60. The other ends of passages 76 are directed toward the bearing elements 78 of bearing 38. Sleeve passages 76 and radial passage 74 are in open communication at their outer ends with the flyweight casing chamber 80.

A collecting tube 82 has one end disposed in flyweight chamber 80 and suitably secured to casing 84 radially outwardly of flyweights 32 and generally tangentially related thereto. The inlet end of collecting tube 82 has an elongated opening 86. Tube 82 extends axially through apparatus 10 terminating at its other end within and supported by casing 56. A passage 88 is formed in casing 56 in communication at one end with tube 82 and at its other end openly communicating with the space exteriorly of apparatus 10.

The operation of the subject lubricating device is as follows: as the governor shaft 30 is rotated, flyweights 32 will also rotate and in so doing create a centrifuging action resulting in a partial vacuum within the flyweight chamber 80. The partial vacuum draws the oil mist through bearing 52 into spring chamber 62 through annular space 60 where it will flow through inclined passages 76 to lubricate thrust bearing 38. At the same time, oil mist flows out of space 60 to flange ports 64 where it will likewise lubricate bearing 54. The oil mist is then thrown radially outwardly and tangentially due to the centrifuging action of the flyweights where the mist is collected in end 86 of tube 82 and transmitted therethrough to be discharged from casing passage 88. The lubricant that remains in mist form may then be recirculated through the control apparatus while that which returns to a liquid form may drip down and be collected in sump casing 20.

It is apparent that the subject lubricating mechanism may be achieved with a relatively slight modification of the existing control apparatus resulting in an inexpensive lubricating system which insures a considerably longer bearing life. It is also obvious that certain structural modifications may be made in the lubricating mechanism within the intended scope of the invention as set forth in the hereinafter appended claims.

I claim:

1. A lubricating system for a speed controlled apparatus, said apparatus comprising a housing, a shaft member disposed within said housing, a plurality of bearing members rotatably supporting said shaft within said housing, a chamber formed within said housing, a plurality of flyweight members disposed within said chamber and mounted for rotation with said shaft, a sleeve member coaxially disposed about said shaft member and radially spaced therefrom to define an annular passage therebetween, a thrust bearing member disposed intermediate said sleeve member and said flyweights for imparting an axial movement to said sleeve as said flyweights are caused to move under the action of centrifugal force, said annular passage communicating at one end with a space exteriorly of said apparatus, first port means having an end axially aligned with one end of said annular passage and another end terminating adjacent one of said shaft supporting bearings, second port means communicating at one end with said annular passage and terminating at the other end proximate the thrust bearing, said first and second ports also communicating with said flyweight chamber, a conduit disposed within said housing and terminating at one end in an open portion disposed radially outwardly of said flyweights, the other end of said conduit being supported within said housing and communicating with the space exteriorly of the apparatus, and means for supplying an oil mist lubricant to said space exteriorly of said apparatus, rotation of said flyweights being adapted through centrifugal action to draw said mist through said annular passage where it will be discharged to said first and second ports against the bearings respectively disposed proximate thereto after which said lubricant is withdrawn from said chamber by said conduit and returned to the space exteriorly of said apparatus.

2. A lubricating system for a speed controlled apparatus, said apparatus comprising a housing, a shaft member disposed within said housing, a plurality of bearing members rotatably supporting said shaft within said housing, a flange member fixed for rotation with said shaft, an enlarged chamber formed within said housing, a plurality of flyweight members pivotally mounted on said flange, a sleeve member coaxially disposed about said shaft member and radially spaced therefrom to define an annular passage therebetween, a thrust bearing member mounted on said sleeve member, said flyweights being adapted to engage said thrust bearing to impart an axial movement to said sleeve as said flyweights move under the action of centrifugal force, said annular passage communicating at one end with a space exteriorly of said apparatus, first port means formed in said flange and having an end axially aligned with one end of said annular passage and another end terminating adjacent one of said shaft supporting bearings, second port means formed in said sleeve communicating at one end with said annular passage and terminating at the other end proximate the thrust bearing, said first and second ports also communicating with said flyweight chamber, a conduit disposed within said housing and terminating at one end in an open portion disposed radially outwardly of said flyweights, the other end of said conduit being supported within said housing and communicating with the space exteriorly of the apparatus, and means for supplying an oil mist lubricant to said space exteriorly of said apparatus, rotation of said flyweights being adapted through centrifugal action to draw said mist through said annular passage where it will be discharged to said first and second ports against the bearings respectively disposed proximate thereto after which said lubricant is withdrawn from said chamber by said conduit and returned to the space exteriorly of said apparatus.

3. A lubricating system for a control apparatus of the type including a housing within which is disposed a rotatable shaft having a plurality of flyweights fixed for rotation thereon and which shaft is mounted within said housing in a plurality of supporting bearing members, said system including means for providing an oil mist lubricant exteriorly of said housing, passage means disposed proximate the axis of said shaft and communicating with at least one of said bearing members, said passage means also communicating with the space exteriorly of said housing exposed to said oil mist, the rotation of said flyweights creating a centrifuging action to draw said oil mist through said passage means and expose said bearing members to the lubricant, and conduit means including one end disposed within said housing in radially spaced relation to said flyweights, the other end of said conduit means communicating with the space exteriorly of said housing whereby the centrifuging action of said flyweights will cause said lubricant to be collected within said conduit means and returned to the space exteriorly of said housing.

4. A lubricating system as set forth in claim 1 in which the open portion of said conduit is generally tangentially disposed with respect to said flyweights.

5. A lubricating system as set forth in claim 1 in which said bearing members are unsealed permitting lubricant to pass therethrough.

References Cited in the file of this patent

UNITED STATES PATENTS

| | | |
|---|---|---|
| Re. 13,682 | Windeler et al. | Feb. 3, 1914 |
| 2,401,558 | Edwards | June 4, 1946 |
| 2,513,674 | Price | July 4, 1950 |
| 2,606,752 | Slonneger | Aug. 12, 1952 |